J. T. FISK.
PHOTOGRAPHIC SHUTTER.
APPLICATION FILED MAY 28, 1909.

973,020.

Patented Oct. 18, 1910.
4 SHEETS—SHEET 2.

Witnesses:—

Inventor:—
Joshua T. Fisk
By Pierce & Fisher
Attys.

UNITED STATES PATENT OFFICE.

JOSHUA T. FISK, OF ROCHESTER, NEW YORK, ASSIGNOR TO CROWN OPTICAL COMPANY, OF ROCHESTER, NEW YORK, A CORPORATION.

PHOTOGRAPHIC SHUTTER.

973,020.   Specification of Letters Patent.   Patented Oct. 18, 1910.

Application filed May 28, 1909. Serial No. 498,882.

*To all whom it may concern:*

Be it known that I, JOSHUA T. FISK, a citizen of the United States, and a resident of Rochester, county of Monroe, and State of New York, have invented certain new and useful Improvements in Photographic Shutters, of which the following is a specification.

The invention relates to photographic shutters and seeks to provide an improved arrangement of shutter blades which can be operated at high speed and which are arranged to increase the area of the lens aperture upon the initial opening movement of the blades.

Further objects of the invention are to improve and simplify the shutter operating means and the controlling devices therefor by which "time," "bulb" and instantaneous exposures are effected.

The invention consists in the features of improvement hereinafter set forth and more particularly pointed out in the appended claims.

The preferred form of the invention is illustrated in the accompanying drawings in which—

Figures 1, 2, 3, 4:
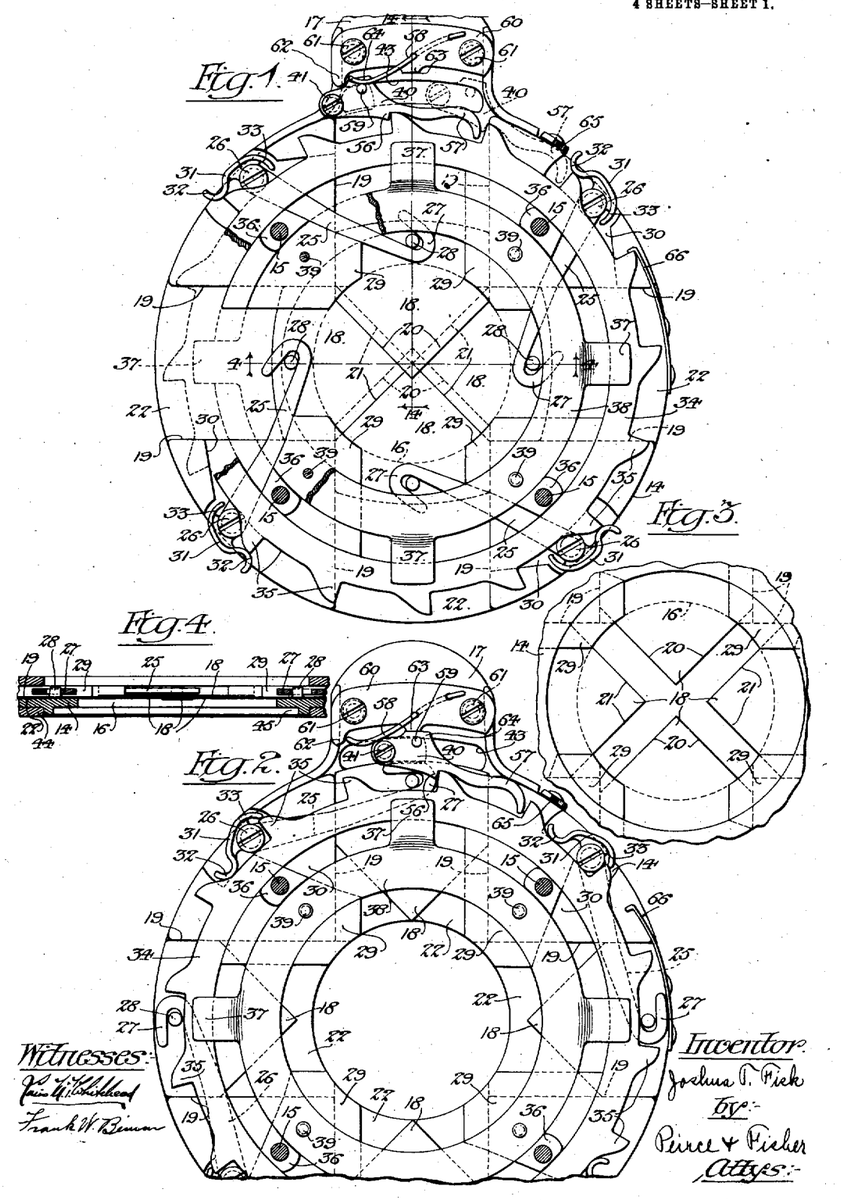
Figure 1 is a view in elevation of the rear face of the improved shutter with the casing omitted and illustrating the arrangement of the shutter blades and the shifter mechanism therefor, the blades being shown in their normal, closed position.
Fig. 2 is a similar view with the blades shown in open position.
Fig. 3 is a detail view illustrating the initial or partially open position of the shutter blades.
Fig. 4 is a detail section on the line 4—4 of Fig. 1.
Figure 5:
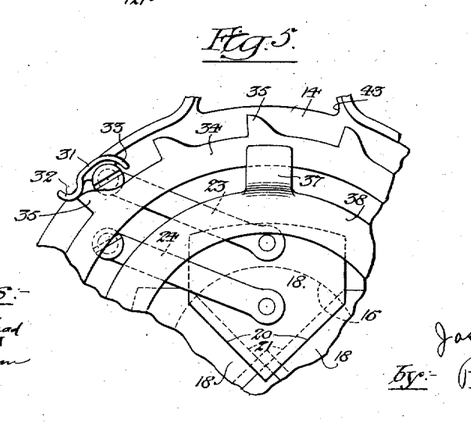
Fig. 5 is a detail view illustrating a modification.

The improved shutter is inclosed in a suitable casing of general circular outline (see Figs. 5, 13 and 14) and having a projecting portion at its top. The casing comprises front and back plates 10 and 11 and an intermediate peripheral wall 12. The front and back plates 10 and 11 are provided with apertures 13 within which the lens supporting rings may be secured in any suitable manner. The shutter mechanism is mounted upon a suitable supporting plate 14 which is of the same general outline as the inclosing casing, and which is removably secured in position therein by screws 15. The supporting plate 14 is provided with an aperture 16 and with a projecting portion 17 at the upper side thereof. Three or more shutter blades 18 (preferably four as shown) are employed and are arranged in a circular series at equal distances apart about the aperture 16. These blades are provided with beveled or pointed, inner ends that are adapted to overlap in closed position. In the preferred form, the blades 18 slide radially from and to the center of the aperture in guide grooves or ways upon the rear face of the supporting plate 14. The outer portions of the blades being provided with parallel side edges which engage the shoulders 19 on the plate 14 that form the guide grooves or ways. Where four blades are employed, two diametrically opposite blades (the side blades in the form shown) are arranged in the same plane and the points thereof meet in closed position, as shown in Figs. 1 and 4. The other two blades (the upper and lower ones in the form illustrated) are offset or spaced apart for a distance equal to the thickness of the side blades, so that, when the blades are in closed position, the upper blade engages the rear faces of the side blades and the lower blade the front faces thereof, the beveled edges 20 of the upper and lower blades overlapping the beveled edges 21 of the side blades. The faces 22 between the edges or shoulders 19 on the supporting plate 14 are arranged to hold the blades in the relation set forth and there can be no leaking of light through the shutter when the blades are in closed position. As the blades are shifted radially between the guiding edges or shoulders 19, the edges 20 and 21 of adjacent blades are maintained substantially in parallel relation, so that, as illustrated in Fig. 3, as soon as any portion of the lens aperture is exposed, a series of divergent radial slits extending to the periphery of the aperture, are opened and all portions of the sensitive plate or film are flooded with light. With four pointed or bevel ended shutter blades, as in the preferred form shown, four of these radial slits are opened as soon as the center of the lens is uncovered and they are so arranged at an angle of forty-five degrees to the horizontal and vertical that the light passes therethrough to all four corners of the plate or film. With this arrangement of pointed or beveled ended shutter blades that are bodily shifted from and to the center of the aperture, and in which the edges of adjacent blades are maintained in substantially parallel relation as the blades are shifted, it is possible to obtain good results at higher speeds than if the blades were otherwise arranged. While the blades are preferably arranged to shift in radial guideways, as shown in Figs. 1 and 2, each blade may be mounted upon a pair of parallel movement arms 23 and 24 as shown in Fig. 5, with like beneficial results.

A series of shifter arms 25 are provided for the blades. These arms are connected by pivot screws 26 to the supporting plate 14 at points adjacent the periphery thereof and, at their inner, free ends, are provided with hooks 27 that engage pins 28 fixed to the outer portions of the blades 18. To prevent the binding of the blades within the guide edges 19, the edges of the hooks 27 that engage pins 28, are not parallel but flare slightly from the bends of the hooks, as shown. The blades are held in position against the faces 22 of the guide grooves by filler blocks or pieces 29 that are secured to the plate 14 and the edges of these filler blocks or pieces overlap the guide shoulders 19 and the parallel side edges of the blades. These filler pieces are provided with recesses 30 within which the shifter arms 25 move in shifting the blades between the closed position, shown in Fig. 1, and the open position shown in Fig. 2.

Figures 12, 13, 14:
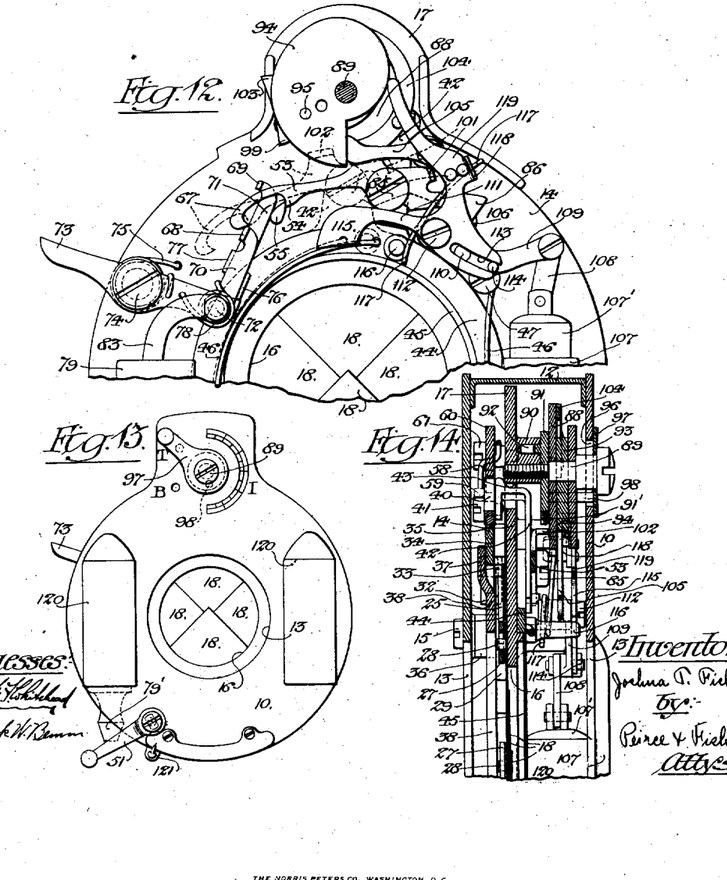
Fig. 12 is a similar view with the controlling or timing device shown in proper position for effecting instantaneous exposures and with the operating mechanism shown in full lines in "set" position and in dotted lines in "open" position.
Fig. 13 is a view in front elevation of the shutter casing.
Fig. 14 is a cross-section of the upper portion of the improved shutter shown inclosed in its casing.

The shifter arms 25 are preferably formed of sheet metal and have portions extending beyond the pivot screws 26 that are turned up to form cams 31 having reversely curved lugs 32 and 33 on the opposite sides of pivots 26 of the shifter arms. The arms 25 are actuated from a ring 34 that rests upon the faces of the filler pieces or blocks 29 adjacent the periphery of the supporting plate 14, and is provided with a series of teeth 35 which operate upon the lugs 32 and 33 to shift the arms 25. The inner periphery of the ring 34 abuts against a series of projecting lugs 36 upon the filler pieces 29 and is rotatably held in position by a series of radial lugs 37 on an inner ring 38 that rests upon the filler pieces or blocks 29 and is secured thereto by rivets or pins 39. The screws 15 that fasten the shutter to the back plate 11 of the casing, engage the projecting lugs 36, as indicated in Figs. 1, 2 and 14. The teeth 35 of the actuator ring 34 are provided with radial faces and with inclined or cam faces which coöperate with the lugs 32 and 33 of the cams 31. Normally, the teeth engage the lugs 32 and hold the shutters in closed position, as shown in Fig. 1. By shifting the actuator ring through a space equal to one-half the distance between its teeth, the teeth are brought into engagement with the lugs 33 and the arms 25 are shifted to open the shutter blades, as shown in Fig. 2. A further shift in the same direction of the ring through a distance equal to one-half of the space between teeth, moves the arms 25 and restores the shutter blades to closed position by the action of the teeth 35 of the actuator ring upon the lugs 32. It will thus be seen that the shift of the actuator ring in the same direction through a distance equal to the space between its teeth, will open and close the shutter blades. This ring is thus always shifted, step-by-step, in the same direction to effect the exposures.

The actuator ring 34 is shifted by a pawl 40 that is connected by a pivot pin 41 to the upper end of an operating arm or lever 42. This operating arm or lever is mounted upon the front side of the supporting plate 14 and its upper end is bent rearwardly and extends through a segmental slot 43 formed in the upper portion of the plate 14 at the base of the projecting portion 17 thereof. The actuator ring 34 which shifts the shutter blades, rotates about an axis concentric with the shutter and the aperture thereof and, for proper operation, the lever 42 and pawl 40 which shift the ring, are arranged to oscillate about the same center or axis. For this purpose, the operating lever is provided with an annular portion or ring 44

(see Figs. 5, 6 and 12) which is rotatably mounted upon an annular flange 45 formed upon the front face of the plate 14 about the aperture therein. The operating lever is shifted from its "set" position, shown in full lines in Fig. 7, to its "closed" position, shown in dotted lines in this figure and in full lines in Fig. 6, by a drive spring 46 which is fixed at one end to the lever, extends around the aperture 16 and is fixed at its opposite end to the supporting plate 14 by a screw 47. This shift of the operating lever, moves the pawl 40 from the position shown in Fig. 1 to the position shown in dotted lines in this figure, and thereby serves to shift the actuator ring 34 through a space equal to the distance between its teeth, and thereby open and close the shutter blades. The operating lever and pawl 40 are shifted to set position against the tension of the spring 46 by a pair of toggle links 48 and 49 (see Fig. 7) that are pivoted respectively to the ring 44 of the operating lever and to the supporting plate 14. A stud 50, fixed to the toggle link or arm 49 and concentric with the pivot thereof, is provided with an exterior handle 51 (see Figs. 6 and 13) for setting the operating lever of the shutter. The setting movement of the toggle link 49, is limited by a stop screw 52 fixed to the plate 14. During the setting movement of the lever 42, the pawl 40 connected thereto moves in backward direction idly over the teeth 35 of the ring 34 from the position shown in dotted lines in Fig. 1 to that shown in full lines. The operating lever and the pawl 40 are held in their "set" position, shown in full lines in Figs. 1 and 5, with the driving spring 46 under tension by a latch 53 (see Fig. 7) which is provided with a shoulder 54 adapted to engage the beveled edge of a fixed stop pin 55 on the front face of the supporting plate 14. This latch is tripped, and the movement of the operating lever controlled, by suitable exposing and timing devices hereinafter set forth.

The pawl 40 which operates the ring 34, is provided with a shoulder 56 that is arranged to engage the abrupt or radial face of one of the teeth 35 of the ring, and is also provided with a forwardly projecting extension 57 which is substantially equal in length to the spaces between the teeth 35. The operating pawl normally occupies the position shown in dotted lines in Fig. 1 but is shifted to the position shown in full lines by the setting of the operating lever. In this position, the shoulder 56 of the pawl is pressed into engagement with one of the teeth 35 of the ring 34 by a spring 58 which engages a pin 59 on the pawl adjacent its pivot. This spring is mounted on a plate 60 which is supported in offset position upon the rear side of the projection 17 of the plate 14 by a pair of screws 61. The portion of the pawl extension 57 adjacent the shoulder 56 is curved downwardly to a slight extent over the inclined face of the tooth 35 that is engaged by the shoulder 56, so that the actuator ring 34 cannot move independently of the pawl without swinging the pawl about its pivot 41. But, in the "set" position of the pawl, a lug 62 on the plate 60 is arranged immediately above the pawl adjacent its pivoted end and prevents the upward swinging movement of the pawl about the pivot 41, so that, in this position, the ring 34 is locked against accidental movement independently of the pawl 40. In the open position of the shutter blades shown in Fig. 2, the pawl is similarly locked by a lug 63 on the plate 60 which then engages a shoulder 64 upon the upper edge of the pawl, and, in the normal or "closed" position of the shutter, the pawl is locked by a lug 65 fixed to the edge of the plate 14 which engages the forward end of the pawl extension 57. The engagement of the lug 65 with the pawl extension 57 prevents any overthrow of the actuator ring 34 when the pawl 40 is shifted by the spring-actuated lever 42 from the position shown in full lines in Fig. 1 to that shown in dotted lines to thereby operate the actuator ring and the shutter blades. The actuator ring is also, as stated, locked in the "set" and in the "open" positions of the shutter, so that the actuator ring is at all times maintained in proper relation to the operating pawl 40. While the lug 65 prevents the actuator ring from swinging the pawl about its pivot 41, the pawl can be disengaged from the lug during the setting operation, since then it moves not only about its pivot 41 but also in backward direction from the position shown in dotted lines to that shown in full lines in Fig. 1. A spring retaining pawl 66 is also preferably mounted upon the edges of the supporting plate 14, and is arranged to engage one of the teeth 35 of the ring 34 to hold the ring against backward movement.

The actuator ring 34 is always driven in the same direction and, as stated, the movement of the ring effected by the spring-driven operating lever and pawl 40 through a distance equal to the space between its teeth, will open and close the shutter blades. During both the opening and closing movement of the shutter blades, the main operating parts move in one direction only, so that the shutter blades can be opened and closed at a very high speed, since it is not necessary, after the shutter blades have been opened, to arrest the momentum of the operating parts and reverse their direction of movement. If the shutter blades are mounted upon a pair of parallel motion arms, as shown in Fig. 5, they are operated from a toothed ring in the same manner as shown in Figs. 1 and 2. The cam lug 31, which is operated upon by the teeth 35 of the ring, being mounted upon the outer arm 23, as shown.

The latch 53 on the operating lever 42 (see Figs. 7, 8, 11 and 12) is provided with an extension 67 projecting beyond the shoulder 54 thereof and this extension is arranged to be engaged by a pair of upturned lugs 68 and 69 formed respectively upon two trip arms 70 and 71. These trip arms are connected by a pivot pin 72 to the inner end of an exposing lever 73. The exposing lever is mounted intermediate its ends upon a pivot pin 74 that is fixed to the plate 14 and the outer end of the lever extends through a suitable opening in the inclosing casing. A spring 75, coiled about the pivot pin 74, is fixed at its ends to the plate 14 and to the lever 73 and tends to force its inner end downwardly and its outer end upwardly. The trip arm 71 is provided with a downturned lug 76 (see Fig. 7) which is arranged to engage a square shoulder on the inner end of the exposing lever 73 beyond the pivot pin 72. The trip arm 70 (see Figs. 6 and 7) is provided with a downturned lug 77 that engages the outer side of the trip-arm 71. A spring 78, coiled about the pivot pin 72, is connected at one end to the exposing lever 73 and the opposite end engages the edges of the trip-arms 70 and 71, so that the latter are held in the position shown with the lug 76 on the trip-arm 71 engaging the end of the exposing lever 73 and with the lug 77 on the trip-arm 70 engaging the outer edge of the trip-arm 71. By this arrangement, a yielding, one-way connection is formed between the trip-arms and the exposing lever, and the trip-arms can move in one direction against the tension of the spring 78 independently of the exposing lever. The lug 69 on the trip-arm 71 engages the upper edge of the latch 53 and, when the latter is shifted to set position, the lug 69 is pressed by the springs 75 and 78 against the latch to insure the engagement of the lug 54 thereon with the fixed stop 55. In this "set" position of the latch, the lug 68 on the trip-arm 70 is in proper position to engage the downturned end of the latch extension 67 and disengage the latter from the fixed stop 55 when the inner end of the exposure lever 73 is raised. The lug 68 then passes up into line with the lug 54 but the engagement of these lugs will not arrest the latch and operating lever, since the trip-arm is free to yield in outward direction against the pressure of the spring 78.

The inner end of the exposure lever 73 can be lifted to trip the latch, either by depressing the outer end of the lever or by means of the usual air bulb, the tube of which can be connected to a suitable nipple 79' that is screw-threaded into the bottom of an air cylinder 79 fixed to the outer face of the plate 14 at one side thereof. A cylindrical piston 80 within the cylinder, is provided with an interior chamber 81 having a conical lower end 82. An arm 83 extends within the chamber of the piston 80 and its upper end is inwardly offset and connected by the pivot pin 72 to the inner end of the exposing lever 73. The lower end of this arm is provided with a circular head 84 which will properly center and seat itself within the conical lower end 82 of the piston chamber and thereby obviate the necessity of connecting the arm to the piston. The engagement of the piston with the upper end of the nipple 79' limits the downward movement thereof and of the inner end of the exposing lever 73.

The latch 53 is pivoted to the operating arm or levers 42 intermediate its ends by a pivot screw 85. When the operating lever is shifted to "set" position, the right-hand end of the latch is depressed, as stated, by the lug 69 on the trip-arm 70 into engagement with the fixed stop or lug 55. At this time, the left-hand end of the latch engages a lug 87 on the plate 14 and so limits the movement of the latch that the lug 54 thereon only slightly overlaps the beveled edge of the stop lug 55, and the tripping devices need only impart a slight movement to the latch to release it from the stop lug.

An adjustable timing device is provided for arresting the operating lever 42 with the shutter blades in open position. The timing device is in the form of a rotatably adjustable plate 88 (see Figs. 7, 8 and 11) which is preferably mounted upon a screw 89 (see Figs. 13 and 14). This screw is provided with a reduced inner end which is threaded into a boss 90 on the front side of the projecting portion 17 at the top of the supporting plate 14, as clearly shown in Fig. 14. A circular plate 91 is interposed between the plate 88 and the boss 90 and is fixed in position by a pin or projection 92 thereon engaging an opening in the boss. A small, intermediate cam 93 (see Figs. 7, 8, 11 and 14) and an outer cam 94, are also mounted upon the shank of the screw 89, the cam 93 being arranged intermediate the cam 94 and the plate 88. For the sake of clearness, the outer cam 94 is omitted in Figs. 7, 8 and 11. The plate 88 and the intermediate and outer cams 93 and 94 are rotatable together upon the shank of the screw 89 and form a single adjustable timing device for setting the shutter mechanism to effect "time," "bulb," and instantaneous exposures. Except for the convenience of manufacture, these three parts could be formed of a single piece. As shown, they are held in proper relation by a pin 95 extending therethrough, and they are held in place against the face of the plate 90 by the enlarged, outer end of the screw 89, the shoulder of which engages the face of the outer cam 94. The outer end of the screw passes through an enlarged opening 96 in the front base plate 10 of the casing and the head of the screw engages the hub of a sheet metal crank-arm 97. A pin 98 on the crank-arm, extends through the opening 96 and through holes formed in the cams 93 and 94 and in the plate 88, so that these three parts are rotated by the crank-arm 97. The head of the screw 89 is arranged to hold the hub of the crank-arm 97 snugly against the face of the front plate 10 of the casing, so that considerable friction is developed between these parts to properly hold the timing device in adjusted position. The crank-arm 97 is also preferably provided on its under side with a part arranged to engage one or the other of a pair of seats formed in the front plate 10 of the casing. These seats (see Fig. 13) are marked T and B respectively and are arranged to hold the timing device in proper position to effect either "time" or "bulb" exposures. The front of the casing is also provided with a semi-circular scale marked "I," and when the crank-arm is brought opposite this scale, the timing mechanism of the shutter is in proper position to effect "instantaneous" exposures of different speeds.

Figures 7, 8, 9, 10:
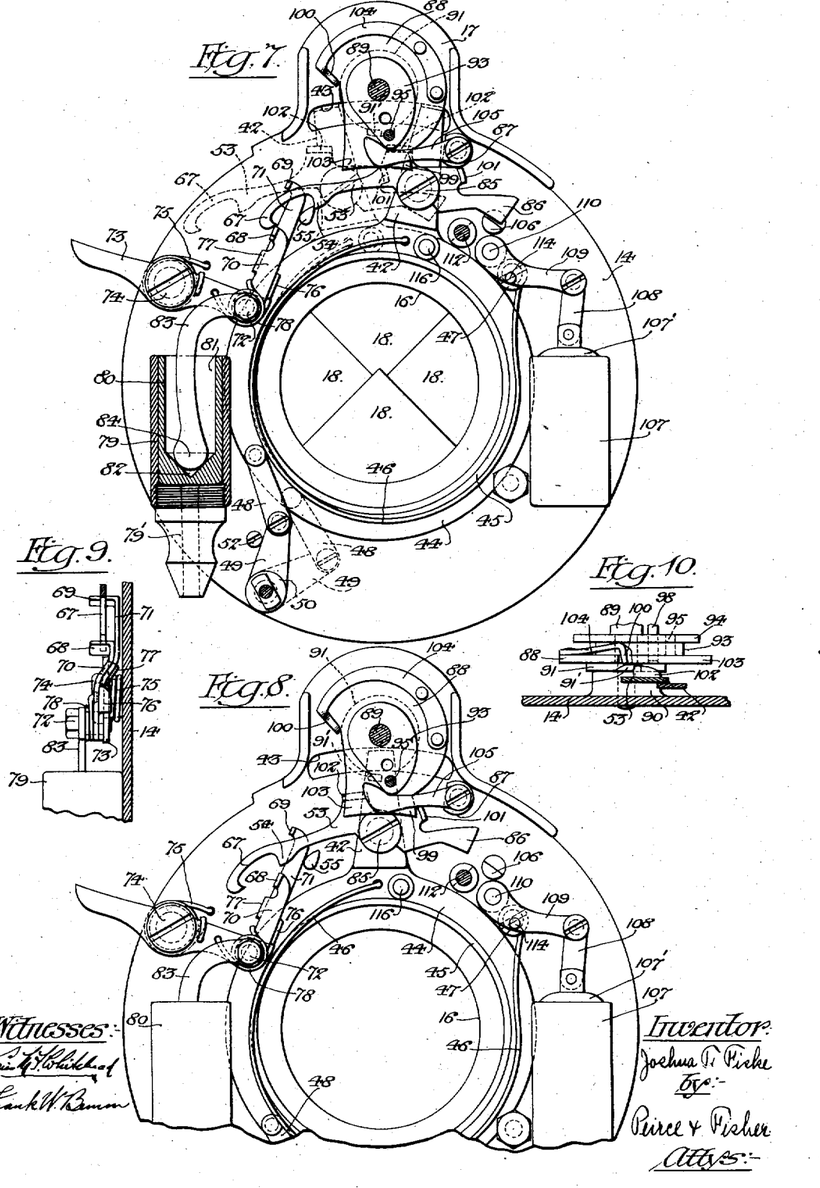
Fig. 7 is a view in elevation of the front side of the shutter with the casing removed and with the exposing cylinder and piston shown in section. In this figure, the controlling mechanism is shown in position for effecting time exposures, and the operating mechanism is shown in its "set" position in full lines and in its normal or "closed" position in dotted lines.
Fig. 8 is a view similar to Fig. 7 showing the operating mechanism arrested by the controlling devices with the shutter blades open.
Fig. 9 is a detail view in side elevation of the exposing lever and the trip devices connected thereto.
Fig. 10 is a detail view of the controlling or timing means.

The timing plate 88 is provided with two stop lugs 99 and 100 which are arranged to coöperate respectively with a pair of out-turned lugs 101 and 102 formed upon the upper edge of the latch 53 and on opposite sides of its pivot 85. The controlling device is shown in proper position for effecting "time" exposures in Figs. 7 and 8. After the operating lever and latch have been set, as shown in full lines in Fig. 7, it is tripped by a single movement of the exposing lever 73 and the operating lever is moved by its spring 46 until the lug 101 of the latch engages the stop lug 99 as shown in Fig. 8. The operating lever is then arrested with the shutter blades in open position. At the next operation of the exposing lever, the lug 68 on the trip-arm 70 will engage the lug 54 of the latch and lift its left-hand end so that the lug 101 on its right-hand end will be disengaged from the lug 99 and the operating lever then further moved by the spring 46 to the position shown in dotted lines in Fig. 7 to thereby close the shutter blades. When the latch is in set position, its rear end 86 engages a lug 106 fixed upon the face of the plate 14. This lug is so arranged that it throws the right-hand end of the latch upwardly, upon the initial movement of the latch and operating lever, and thereby insures the engagement of the lug 101 on the latch with the stop lug 99.

Figure 11:
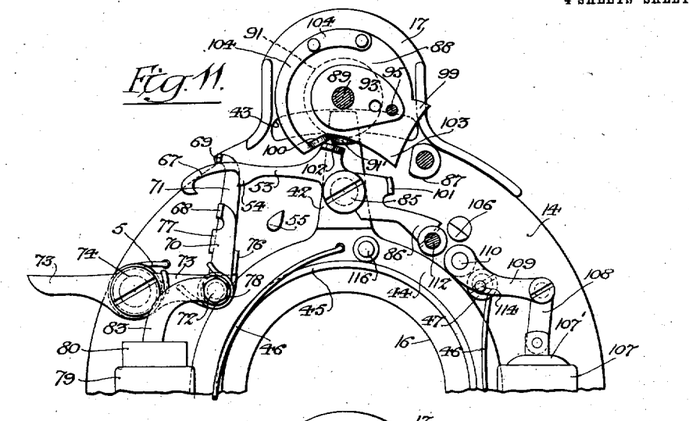
Fig. 11 is a view similar to Figs. 7 and 8 with the timing or controlling device in proper position for effecting "bulb" exposures and with the operating mechanism arrested thereby in "open" position.

The timing and controlling device is shown in position to effect the "bulb" exposures in Fig. 11. As there shown, when the latch is tripped by the upward movement of the inner end of the exposing lever, the spring 46 will move the operating lever and latch until the lug 102 on the latter engages the stop lug 100 upon the timing device. Then, when the exposing lever is released, the spring 75 will depress its inner end and the lug 69 on the trip 71 will depress the left-hand end of the latch and disengage its lug 102 from the stop lug 100, so that the spring 46 can complete the shift of the operating lever and close the shutter blades. The plate 88 is also provided with a projecting point or lug 103 intermediate the stop lugs 99 and 100. When the timing plate is in position for effecting "bulb" exposures, as shown in Fig. 11, the lug 101 on the latch will, upon the initial movement of the operating lever after the latch has been tripped, engage the lug 103 on the plate 88, so that the right-hand end of the latch will be depressed and its left-hand end elevated and thereby insure the engagement of the lug 102 on the latch with the stop lug 100.

The lug 101 upon the latch extends upwardly into the plane of the plate 88, but the lug 102 does not and is free to move beneath the projections 99 and 103 on the plate, so that, when the timing plate is in the position shown in Figs. 7 and 8, these lugs do not interfere with the setting operation of the lever 42 and latch connected thereto. The stop 100 depends below the plate 88 and is formed upon the free end of a segmental spring 104 that is fixed at its opposite end to the plate. The lug 102 on the latch, which coöperates with the stop 100, is shaped as shown in Fig. 10; that is to say, with an abrupt and an inclined face. When the timing device is in the position shown in Fig. 11, the lug 100 does not interfere with the setting operation of the lever 42 on the latch since, under such circumstances, the inclined face of the lug 102 will engage the depending stop 100 and lift it out of its path. Upon the return movement of the lever, however, the abrupt face of the lug 102 engages the depending stop 100, and the operating lever is arrested with the shutter blades in open position, as described, until the exposing lever is released.

It is thus obvious that the operating lever and latch may be properly shifted to set position in any adjustment of the timing or controlling device. Means are also provided for permitting the adjustment of the timing or controlling device in any position of the operating lever and latch. When the operating lever and latch are in "set" position, the adjustment of the timing device in left-hand direction would bring the lug 100 into engagement with the lug 102 on the latch. To prevent this, the fixed plate 91 below the adjustable time plate 88, is provided at its lower edge with a projecting lug 91′ (see Figs. 8, 10, 11 and 14) which has an inclined edge, arranged to engage the depending stop 100 and lift it over the lug 102 on the latch, as shown in Fig. 10. When the operating lever and latch are in the normal position, shown in Fig. 6 and in dotted lines in Fig. 7, the lug 101 on the latch might engage the shoulder 99 on the timing plate when the latter is rotated in left-hand direction. To prevent this, an arm 105 is pivoted on the lug 87 on the plate 14 and this arm extends into position between the lug 101 on the latch and intermediate cam 93. The point of this cam and the toe of this arm are so arranged that, when the timing plate is adjusted in left-hand direction, they will depress the right-hand end of the latch and move the lug 101 thereon out of the path of movement of the stop lug 99 on the timing plate. It is thus possible to rotatably adjust the timing device, whatever may be the position of the operating lever and latch.

When the timing device is so adjusted that the stop lugs 99 and 100 are out of the path of movement of the lugs 101 and 102 on the latch, the exposure is "instantaneous". The speed of these exposures is controlled by a suitable retarding device comprising a dash-pot cylinder and piston 107 and 107′. The cylinder is mounted upon the face of the plate 14 on the right-hand side thereof, and the dash-pot piston is connected by a link 108 to the end of an arm or lever 109 which is mounted at its inner end upon a pivot pin 110 upon the supporting plate 14. A lever 111 forming part of the retarding device is pivoted intermediate its ends upon a pin 112 adjacent the pivot 110 of the arm 109. One end of this lever extends across the pivot pin 110 and is provided with a segmental slot 113 that engages a pin 114 on the arm 109. The opposite end of the lever 111 is provided with a downturned lug 115 which is arranged to coöperate with a pin 116 on the ring portion 44 of the operating arm or lever 42. A spring 117 is coiled about the pivot pin 112 and one end of this spring engages a depending lug 118 on an extension 119 of the lever 111. This extension 119 projects upwardly and is arranged to engage the outer cam 94 of the timing device. The outer cam is provided with a large semi-circular portion which extends over the stop lugs 99 and 100 and the projection 103 of the plate 88. The remaining portion of the edge of the cam is arranged at varying distances from the center thereof.

Figure 6:
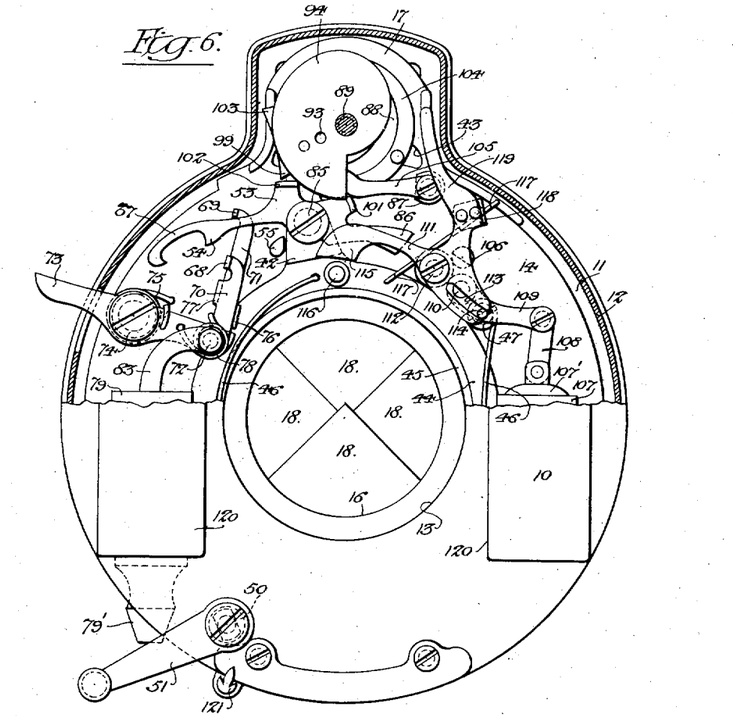
Fig. 6 is a view in front elevation of the improved shutter with the upper half of the inclosing case broken away. In this figure, the controlling mechanism is shown in position for effecting instantaneous exposures and the shutter operating mechanism is shown in normal position.

When the controlling device of the shutter mechanism is set for "time" or "bulb" exposures, the extension 119 of the lever 111 is engaged by the large semi-circular portion of the cam 94 and the lever and the dash-pot are held thereby in the normal position shown in Fig. 6. Under such circumstances, the projection 115 on the lever 111 is at all times held out of the path of movement of the pin 116 on the ring 44 of the operating lever and the pin simply moves against the end of the spring 118 and compresses it when the operating lever is shifted to its "set" position. This spring then serves to assist in the return or operating movement of the lever 42. The retarding device in a similar manner is held out of operation by the large portion of the cam 94 when the controlling mechanism is in proper position to effect instantaneous exposures of greatest speed. In Figs. 6 and 12, the timing device is shown in proper position for effecting instantaneous exposures in which the return or operating movement of the lever 42 is retarded. Under such circumstances, the spiral portion of the edge of the cam 94 is opposite the end of the extension 119 on the lever and, as shown in Fig. 6, the retarding lever is normally held out of the path of movement of the pin 116 on the operating lever. But as the latter is shifted to its "set" position (shown in full lines in Fig. 12), the pin 116 engages the end of the spring 118 and, through the medium of the spring, rocks the lever 111 and lifts the piston of the dash-pot until the extension 119 of the lever engages the edge of the cam 94. At the same time, the lug 115 on the lever is moved into the path of movement of the pin 116 and will engage the same and retard the return movement of the operating lever, as shown in dotted lines in Fig. 10. The extent to which the dash-pot is lifted and the extent to which the lug 115 is projected into the path of movement of the pin 116, depend upon the adjustment of the cam 94, so that the extent to which the retarding device operates and the speed of the exposures can be nicely controlled by adjusting the cam 94 in accordance with the scale 1 upon the exterior face of the front plate 10 of the casing. It should be noted that the spring 118 forms a yielding connection between the operating lever and the lever 111 for setting the retarding device in operative position, the operative position thereof being varied by the adjustment of the cam 94. It should also be noted that the pivot 110 of the arm 109 is arranged between the pivot 112 of the lever 111 and the pin 114, so that the leverage is increased and the arm 109 is moved substantially through twice as great an arc as the lever 111.

The front plate 10 of the casing, as shown in Figs. 6, 13 and 14, is provided with raised portions which extend over the air cylinder and dash-pot. The casing incloses all portions of the shutter and guards the same and its operating mechanism from dust and the like. The shutter may be provided with the usual iris diaphragm and with the ordinary adjusting device therefor, as indicated in Figs. 5 and 13.

It is obvious that numerous changes may be made in the details set forth without departing from the essentials of the invention.

I claim as my invention:—

1. In a photographic shutter, a circular series of pointed blades bodily movable from and to the center of the lens aperture to open and close the same, said blades being arranged to initially expose a series of divergent radial slots extending from the center to the edge of the aperture, substantially as described.

2. In a photographic shutter, the combination with a suitable support having an aperture therein, of a circular series of pointed blades and means for moving said blades bodily from and to the center of said aperture to open and close the same, said blades being arranged to initially expose a series of divergent radial slots extending from the center to the edge of the aperture and having substantially parallel side edges, substantially as described.

3. In a photographic shutter, the combination with a suitable support having an aperture therein, of a circular series of pointed shutter blades bodily movable in their own planes from and to the center of said aperture to open and close the same, and means for maintaining the edges of the pointed ends of adjacent blades substantially parallel as they are shifted, substantially as described.

4. In a photographic shutter, the combination with a suitable support having an aperture therein, of a circular series of non-pivoted pointed blades arranged to overlap, in normal position, to close said aperture, means for bodily shifting said blades from and to the center of said aperture, and means for maintaining the edges of the pointed ends of adjacent blades substantially parallel as they are shifted, substantially as described.

5. In a photographic shutter, a circular series of pointed shutter blades bodily movable in radial direction to and from the center of the lens aperture to open and close the same, substantially as described.

6. In a photographic shutter, the combination with a suitable support having divergent radial guide-ways therein and a central aperture, of a circular series of blades having pointed inner ends movable in said radial guide-ways from and to the center of the aperture to open and close the same, and means for shifting said blades, the adjacent edges of the pointed inner ends of said blades overlapping in closed position and being maintained in parallel relation as the blades are shifted, substantially as described.

7. In a photographic shutter, the combination with a suitable support having an aperture therein, of a circular series of blades having pointed inner ends bodily movable in opposite directions from and to the center of said aperture to open and close the same, means for shifting said blades, the adjacent edges of the pointed ends of said circular series of blades overlapping in closed position, and means for maintaining such adjacent edges in parallel relation as said blades are shifted.

8. In a photographic shutter, the combination of a suitable support having divergent radial guide-ways and a central aperture, of a circular series of blades having pointed inner ends bodily movable in said radial guide-ways from and to the center of said aperture to open and close the same, a series of shifter arms pivoted to said support and having pin and slot connections with said blades, and a common spring-driven actuator for said arms, the adjacent edges of the pointed inner ends of said blades overlapping in closed position and being maintained in parallel relation as said blades are shifted, substantially as described.

9. In a photographic shutter, the combination with a suitable support having an aperture therein, of a series of blades bodily movable in radial direction from and to the center of said aperture to open and close the same, said blades having pointed inner end portions arranged to overlap in closed position, an actuator ring, a spring-driven member for operating said ring step-by-step in one direction and means operated by said ring for shifting said blades, substantially as described.

10. In a photographic shutter, the combination with a suitable support having an aperture therein, of a series of blades bodily movable in radial direction from and to the center of said aperture to open and close the same, said blades having pointed inner end portions arranged to overlap in closed position, an actuator ring, means for driving said ring step-by-step in one direction, and a series of pivoted shifter arms connected to said blades and operated by said ring, substantially as described.

11. In a photographic shutter, the combination with a suitable support having an aperture therein, of a series of blades bodily movable in radial direction from and to the center of said aperture to open and close the same, said blades having pointed inner end portions arranged to overlap in closed position, a series of pivoted arms connected at their free ends to said blades and having lugs at their pivoted ends, an actuator ring having teeth for engaging said lugs and operating said arms, and a spring-actuated pawl arranged to engage said ring and drive the same step-by-step in the same direction, substantially as described.

12. In a photographic shutter, the combination with a series of reciprocating blades, of an actuator ring for shifting said blades back and forth in opposite directions to open and closed position, and a member for shifting said ring step-by-step in one direction, substantially as described.

13. In a photographic shutter, the combination with a suitable support, of a series of reciprocating blades, a series of shifters connected to said blades, an actuator ring having means for reciprocating said shifters, and a spring-driven member for operating said ring in one direction only, substantially as described.

14. In a photographic shutter, the combination with a suitable support, of a series of reciprocating blades, a series of pivoted shifters connected to said blades, an actuator ring having a series of teeth for engaging and oscillating said shifters and thereby moving said blades in opposite directions to open and closed positions, and means for driving said ring, substantially as described.

15. In a photographic shutter, the combination with a suitable support, of a series of blades, a series of pivoted arms connected at their free ends to said blades and having lugs at their pivoted ends, an actuator ring having teeth engaging said lugs to operate said arms, and a pawl for shifting said ring step-by-step in one direction, substantially as described.

16. In a photographic shutter, the combination with a supporting plate having an aperture therein, of a series of reciprocating blades bodily movable in opposite directions to open and close said aperture, a series of shifters for said blades, an actuator ring for said shifters extending about said aperture, and an operating member for advancing said ring step-by-step in one direction, substantially as described.

17. In a photographic shutter, the combination with a supporting plate having an aperture therein, of a series of blades for opening and closing said aperture, a series of shifters for said blades, an actuator ring for said shifters extending about said aperture, and an operating lever for said ring journaled on an annular flange extending about said aperture, substantially as described.

18. In a photographic shutter, the combination with a series of shutter blades arranged about the lens aperture, of a series of shifters for said blades, an actuator ring for said shifters having a series of teeth, an operating pawl arranged to engage said teeth and having a portion extending over the teeth, and means for holding said pawl in position to prevent the accidental movement of said ring, substantially as described.

19. In a photographic shutter, the combination with a circular series of shutter blades arranged about the lens aperture, of a series of shifters for bodily moving said blades from and to the center of the aperture to open and close the same, an actuator having a series of teeth for reciprocating said shifters, a spring-driven operating member, a pawl carried by said member and arranged to move the actuator ring step by step in one direction, a latch for said operating member, and means for tripping said latch, substantially as described.

20. In a photographic shutter, the combination with a series of shutter blades arranged about the lens aperture, of a series of shifters for said blades, an actuator ring for said shifters having a series of teeth, a spring-driven, operating member, a pawl pivoted thereon and arranged to engage the teeth of said ring to advance the same in one direction, said pawl having a part arranged to extend over the teeth of said ring, and fixed lugs engaging said pawl to lock said ring against accidental displacement, substantially as described.

21. In a photographic shutter, the combination with a series of shutter blades arranged about the lens aperture, of a series of shifters for said blades, an actuator ring for said shifters having a series of teeth, an operating pawl arranged to engage said teeth to advance the same in one direction, said pawl having a portion extending over the teeth, a spring-driven, operating member whereon said pawl is pivoted, releasable latch mechanism for holding said operating member in set and in intermediate or "open" positions, and lugs engaging said pawl in its "set", "open" and "closed" positions to hold said ring against accidental displacement.

22. In a photographic shutter, the combination with a series of shutter blades arranged about the lens aperture, of a series of shifters for said blades, an actuator ring for said shifters having a series of teeth, a spring-driven, operating member, a pawl pivoted thereon and arranged to engage the teeth of said ring to advance the same in one direction to open and close said blades, said pawl having an extension arranged to extend over the teeth of said ring and substantially equal in length to the space between said teeth, and a lug arranged to engage said pawl extension in its normal or "closed" position to hold said ring against accidental displacement, substantially as described.

23. In a photographic shutter, the combination with a supporting plate having an aperture therein, of a series of blades for opening and closing said aperture, a toothed actuator ring for shifting said blades mounted on said plate about said aperture, an oscillating ring mounted on said plate about said aperture, a pawl mounted on said oscillating ring for advancing said actuator ring step-by-step in one direction, and means for controlling the movement of said oscillating ring, substantially as described.

24. In a photographic shutter, the combination with a supporting plate having an aperture therein, of a series of blades for opening and closing said aperture, a toothed actuator ring for shifting said blades mounted on said plate about said aperture, an oscillating ring mounted on said plate about said aperture, a pawl mounted on said oscillating ring for advancing said actuator ring step-by-step in one direction, an actuating spring for said oscillating ring, a releasable latch for holding the same in "set" position, and a toggle device for setting said drive ring, substantially as described.

25. In a photographic shutter, the combination with a supporting plate having an aperture therein, of a series of blades for opening and closing said aperture, a series of shifters for said blades, an actuator ring for said shifter, a spring-actuated, reciprocating member for advancing said ring step-by-step in one direction to open and close said blades, a latch for holding said reciprocating member in "set" position, an adjustable timing device having "time" and "bulb" stops for engaging said latch and arresting said member in open position, and an exposing device arranged to trip said latch and disengage it from said time and bulb stops, substantially as described.

26. In a photographic shutter, the combination with a supporting plate having an aperture therein, of a series of blades for opening and closing said aperture, a series of shifters for said blades, an actuator ring for said shifters, a spring-actuated, reciprocating member for advancing said ring step-by-step in one direction to open and close said blades, a latch for holding said reciprocating member in "set" position, a retarding device for said member, a rotatably adjustable timing member having means for varying the operation of said retarding device and "time" and "bulb" stops arranged to engage said latch and arrest said operating member in "open" position, an exposing lever and a trip operated thereby for releasing said latch and for shifting the same in opposite directions out of engagement with said time and bulb stops, substantially as described.

27. In a photographic shutter, the combination with the shutter blades and an operating member therefor, of a latch pivoted to said operating member, a fixed stop with which said latch engages in set position, an adjustable timing member having "time" and "bulb" stops, said latch having lugs on opposite sides of its pivot for respectively engaging said "time" and "bulb" stops, and an exposing trip for disengaging said latch from said fixed stop and for shifting the same in opposite directions out of engagement with said time and bulb stops, substantially as described.

28. In a photographic shutter, the combination with the shutter blades, of a spring-driven, operating lever therefor, of a latch pivoted on said operating lever, a fixed stop arranged to engage said latch and hold said lever in set position, a rotatably adjustable member having "time" and "bulb" stops, said latch having lugs on opposite sides of its pivot for respectively engaging said "time" and "bulb" stops, an exposing trip for disengaging said latch from said fixed stop, and means for guiding said latch into engagement with said "time" and "bulb" stops, said trip having lugs for shifting said latch in opposite directions out of engagement with said "time" and "bulb" stops, substantially as described.

29. In a photographic shutter, the combination with the shutter blades, of a spring-driven, operating member therefor, a latch connected to said operating member, a fixed stop with which said latch engages to hold said operating member in set position, an adjustable timing member having "time" and "bulb" stops, said latch having lugs arranged to respectively engage said "time" and "bulb" stops to hold said member in "open" position, an exposing lever, and a trip connected to said exposing lever and arranged to disengage said latch from said fixed stop and to shift the same in opposite directions out of engagement with said time and bulb stops, substantially as described.

30. In a photographic shutter, the combination with the shutter blades, of a spring-driven, operating member therefor, a latch connected to said operating member, a fixed stop with which said latch engages to hold said operating member in set position, an adjustable timing member having "time" and "bulb" stops, said latch having lugs arranged to respectively engage said "time" and "bulb" stops to hold said member in "open" position, means for guiding said adjustable stops and said lugs past one another as said timing member is adjusted, and an exposing trip for disengaging said latch from said fixed stop and from said adjustable stops, substantially as described.

31. In a photographic shutter, the combination with the shutter blades and operating member therefor, of a latch pivoted on said operating member, a fixed stop arranged to engage said latch to hold said operating member in set position, an adjustable timing member arranged to engage said latch to hold said member in "open" position, and a spring-held trip device having lugs arranged to engage the opposite sides of said latch, substantially as described.

32. In a photographic shutter, the combination with the shutter blades and operating member therefor, of a latch pivoted on said operating member, a fixed stop arranged to engage said latch to hold said operating member in set position, an adjustable timing member arranged to engage said latch to hold said member in "open" position, a spring-held exposing lever, and a trip device for said latch having a one-way, yielding connection with said exposing lever, substantially as described.

33. In a photographic shutter, the combination with the shutter blades and operating member therefor, of a latch pivoted on said operating member, a fixed stop arranged to engage said latch to hold said operating member in set position, an adjustable timing member arranged to engage said latch to hold said member in "open" position, a spring-held exposing lever, and separate trip arms for said latch having lugs respectively engaging the opposite sides of said latch, said trip arms having one-way, yielding connections with said exposing lever, substantially as described.

34. In a photographic shutter, the combination with the shutter blades, of an operating member therefor, an exposing lever controlling the movement of said operating member, an air cylinder, a piston therein having a conical recess in its lower end, and an arm connected to the exposing lever and having a circular head at its end loosely seated in the conical recess of said piston, substantially as described.

35. In a photographic shutter, the combination with the shutter blades, of an operating member therefor, a retarding device for said member, an adjustable timing member provided with "time" and "bulb" stops for said operating lever and with means for varying the operation of said retarding device, a latch for said operating member and a trip for said latch, substantially as described.

36. In a photographic shutter, the combination with the shutter blades, of an operating lever therefor, a device controlled thereby for retarding the return movement of said lever, a spring operated by the setting movement of said lever for shifting said retarding device to operative position, and an adjustable member for varying the setting movement of said retarding device.

37. In a photographic shutter, the combination with the shutter blades and operating member therefor, of retarding means for said member comprising a dash-pot, a lever connected thereto, a spring for setting said lever and dash-pot in operative position, and an adjustable cam for variably arresting the setting movement of said lever and dash-pot, substantially as described.

38. In a photographic shutter, the combination with the shutter blades and operating member therefor, of retarding means for said member comprising a dash-pot, a lever connected thereto, a pin on said operating member arranged to be engaged by said lever, a spring arranged to be engaged by said pin on the setting of said operating member and thereby shift said lever and dash-pot to operative position, and an adjustable cam for variably arresting the setting movement of said lever, substantially as described.

39. In a photographic shutter, the combination with shutter blades and an operating member therefor, of means for retarding the return movement of said operating member comprising a pivoted arm, a dash-pot connected thereto, a lever pivoted on one side of the pivot of said arm and having a slotted portion on the opposite side of said pivot, said arm having a pin engaging the slot of said lever, means for shifting said lever and an adjustable cam for varying the shift of said lever, substantially as described.

40. In a photographic shutter, the combination with a circular series of blades, said blades being movable in opposite directions from and to the center of the lens aperture to open and close the same, and said blades having pointed inner ends arranged to overlap in closed position, an actuator ring extending about the lens aperture and having means for moving said blades back and forth in opposite directions, and a spring-actuated member for advancing said ring step by step in one direction.

41. In a photographic shutter, the combination with a series of blade shifters of an actuator ring having means for engaging and moving said blade shifters back and forth in opposite directions, and a spring-actuated member for advancing said ring step by step in one direction.

42. In a photographic shutter, the combination of a series of pivoted blade shifters having lugs on opposite sides of their pivots, an actuator ring having teeth arranged to engage said lugs and oscillate said blade shifters back and forth in opposite directions, and means for advancing said actuator ring step by step in one direction.

43. In a photographic shutter, the combination with a circular series of blades, a series of pivoted shifters for moving said blades from and to the center of the lens aperture to open and close the same, said shifters having lugs on opposite sides of their pivots, an actuator ring extending about the lens aperture having teeth for engaging said lugs and oscillating said shifters and said blades back and forth in opposite directions, a spring-actuated member, and a pawl on said member for shifting said actuator ring step by step in one direction.

44. In a photographic shutter, the combination with a circular series of shutter blades movable from and to the center of the lens aperture to open and close the same, said blades having pointed inner ends overlapping in closed position, an actuator ring extending about the lens aperture for shifting said blades, a spring-actuated reciprocating member for advancing said ring step by step in one direction, and means for locking said ring against accidental movement.

45. In a photographic shutter, the combination of an actuator ring movable in one direction only, a spring-driven member movable back and forth in opposite directions, a pawl on said member for advancing said ring step by step, means for locking said pawl to hold said ring against accidental movement, and a series of shifter blades operated by said ring.

46. In a photographic shutter, the combination with an actuator ring extending about the lens aperture, a spring-driven member movable back and forth in opposite directions, a pawl on said member arranged to engage said ring to advance the same step by step in one direction, lugs arranged to engage said pawl to lock said ring against accidental movement, and a series of shifter blades operated by said ring.

47. In a photographic shutter, the combination of an actuator ring movable in one direction, a spring driven operating member movable back and forth in opposite directions, a pawl on said member arranged to engage said ring to advance the same in one direction, shutter blades operated by said ring, releasable latch mechanism for holding said operating member in "set" position and in "open" position, and means for engaging said pawl in its open and closed positions to hold said ring against accidental displacement.

48. In a photographic shutter, the combination of a support having an aperture therein, an actuator ring extending about said aperture, a spring-actuated reciprocating member for advancing said ring step by step in one direction, a series of pivoted blade shifters arranged to be shifted back and forth by said actuator ring, a latch for holding said reciprocating member in "set" position, an adjustable timing member coöperating with said latch to arrest said operating member and said ring in "open" position, and means for tripping said latch.

49. In a photographic shutter, the combination with a supporting plate having an aperture therein, of a circular series of blades about said aperture, said blades being bodily movable from and to the center of the aperture and having pointed inner ends arranged to overlap in closed position, a series of shifter arms pivoted to said support and to said blades, an actuator ring extending about said aperture and having means for oscillating said shifter arms, a spring-actuated, reciprocating member for advancing said ring step by step in one direction, a latch for holding said operating member in "set" position and an adjustable timing member coöperating with said latch to arrest the movement of said member and said ring with the blades in "open" position, and an exposing device for tripping said latch, substantially as described.

50. In a photographic shutter, the combination with a supporting plate having an aperture therein, of a series of shutter blades, a rotatable actuator ring, an oscillating member, and a pawl on said oscillating member arranged to engage said ring to advance the same step by step in one direction, said oscillating member and said ring being mounted on said plate to move about a common axis coincident with the center of said aperture.

JOSHUA T. FISK.

Witnesses:
August J. C. Kineman,
E. P. Howard.